(12) United States Patent
Ellenbogen et al.

(10) Patent No.: US 7,116,751 B2
(45) Date of Patent: Oct. 3, 2006

(54) SYSTEM AND METHOD FOR RESOLVING THREATS IN AUTOMATED EXPLOSIVES DETECTION IN BAGGAGE AND OTHER PARCELS

(75) Inventors: Michael Ellenbogen, Wayland, MA (US); Elan Scheinman, Redwood City, CA (US)

(73) Assignee: Reveal Imaging Technologies, Inc., Bedford, MA (US)

( * ) Notice: Subject to any disclaimer, the term of this patent is extended or adjusted under 35 U.S.C. 154(b) by 80 days.

(21) Appl. No.: 10/817,129

(22) Filed: Apr. 2, 2004

(65) Prior Publication Data

US 2004/0258199 A1    Dec. 23, 2004

Related U.S. Application Data

(60) Provisional application No. 60/459,664, filed on Apr. 2, 2003.

(51) Int. Cl.
*G01N 23/10* (2006.01)
(52) U.S. Cl. ....................................................... 378/57
(58) Field of Classification Search .................. 378/57
See application file for complete search history.

(56) References Cited

U.S. PATENT DOCUMENTS

| | | | |
|---|---|---|---|
| 4,247,774 A | 1/1981 | Brooks ........................ | 250/387 |
| 4,315,157 A | 2/1982 | Barnes .................... | 250/455 T |
| 5,367,552 A | 11/1994 | Peschmann .................... | 378/57 |
| 5,570,403 A | 10/1996 | Yamazaki et al. ............. | 378/5 |
| 5,583,903 A | 12/1996 | Saito et al. .................... | 378/19 |
| 5,600,700 A * | 2/1997 | Krug et al. .................... | 378/57 |
| 5,642,393 A * | 6/1997 | Krug et al. .................... | 378/57 |
| 5,661,774 A | 8/1997 | Gordon et al. .............. | 378/101 |
| 5,692,029 A | 11/1997 | Husseiny et al. ............. | 378/88 |
| 6,185,272 B1 | 2/2001 | Hiraoglu et al. .............. | 378/57 |
| 6,218,943 B1 | 4/2001 | Ellenbogen .............. | 340/572.4 |
| 2002/0176531 A1 | 11/2002 | McClelland et al. .......... | 378/57 |

FOREIGN PATENT DOCUMENTS

| | | |
|---|---|---|
| EP | 0 471 455 A2 | 2/1992 |
| EP | 0 816 873 A1 | 1/1998 |
| EP | 0 825 457 A2 | 2/1998 |
| WO | WO 96/13839 | 5/1996 |
| WO | WO 97/18462 | 5/1997 |
| WO | WO 03/029844 A2 | 4/2003 |

OTHER PUBLICATIONS

International Search Report for PCT/US2004/001929, mailed Jul. 14, 2004.
International Search Report for PCT/US2004/010240, mailed Dec. 27, 2004.
International Search Report for PCT/US03/31718, mailed Nov. 6, 2004.

* cited by examiner

*Primary Examiner*—Edward J. Glick
*Assistant Examiner*—Chih-Cheng Glen Kao
(74) *Attorney, Agent, or Firm*—Mintz, Levin, Cohn, Ferris, Glovsky and Popeo, P.C.

(57) ABSTRACT

The CT threat resolution system includes an primary EDS scanning process to identify threats and the nature of threats and a plurality of secondary CT scanning processes to resolve threats. The primary EDS scanning process and secondary CT scanning processes can be either separate machines or multiple processes within a single scanner. The secondary scanning process may utilizes dual energy scanning and/or high resolution scanning to resolve threats based upon the nature of the threat. An alarm indicates threats which cannot be resolved by the secondary CT scanning process for further operator investigation. Threats may be reviewed and resolved by an operator before the secondary CT scanning process.

14 Claims, 2 Drawing Sheets

SYSTEM AND METHOD FOR RESOLVING THREATS IN AUTOMATED EXPLOSIVES DETECTION IN BAGGAGE AND OTHER PARCELS

This application claims priority to U.S. Provisional Application Ser. No. 60/459,664, filed Apr. 2, 2003.

BACKGROUND OF THE INVENTION

1. Field of the Invention

The present invention relates to a Computed Tomography (CT) Explosives Detection System (EDS) for inspecting baggage for explosives or other contraband. More particularly, it relates to novel Computed Tomography (CT) scanners and processes to resolve threat alarms.

2. Discussion of Related Art

Following the terrorist attacks on Sep. 11, 2001, the United States government decided to implement additional airport security. One of the security measures which were to be implemented was inspection of all checked baggage for explosives. Implementation of this security measure using existing technology will be cumbersome and expensive.

Known Explosives Detection Systems (EDS) utilize either x-ray or computed Tomography (CT) technology to create an image of the contents of a bag.

The Transportation Security Act of 2001 significantly changed the manner in which airports must screen checked baggage. As of December 2001, all checked baggage must be screened for explosives by a technology certified by the newly formed Transportation Security Agency (TSA). To date, the only technology certified by the TSA is Computer Tomography (CT).

A Computed Tomography (CT) machine has been designed to perform automated explosives detection for passenger baggage, parcels, mail, and small cargo prior to loading onto an aircraft. CT technology has been proven to successfully meet the US FAA Certification requirements for automated explosives detection (EDS) in airline checked baggage. Most modern CT machines incorporate a rotating ring or "gantry" on which the X-ray source and detectors are mounted. The gantry rotates continuously, moving the X-ray source and detectors around the object under inspection to make cross sectional "slice" images through the object.

Given the current design of CT technology, the baggage scanners are quite large and cannot process baggage quickly. FIG. 1 is a cross sectional view of a conventional CT scanner 10. The CT scanner 10 includes a gantry 11 surrounding a tunnel 20. A conveyor (not shown) moves baggage through the tunnel 20 for scanning. The gantry 11 rotates about the tunnel, producing one slice of data for each rotation. An x-ray source 30 produces a narrow angle beam 40. A detector 31 is positioned on the gantry 111 to intersect the x-ray beam 40 passing through the tunnel. The detector 31 may consist of multiple detectors which are located equal distances from the x-ray source. The x-ray source 30 and detector 31 must be sized and positioned so that the entire tunnel falls within the x-ray beam. The data from the detector is analyzed using a computer to generate a three-dimensional representation of the contents of the baggage being scanned. The conveyor must move at a slow speed to generate sufficient data for reconstruction of the contents of the baggage from the slices.

Furthermore, the use of CT technology as currently implemented has significant limitations. Specifically, a significant number of false positives (false alarms) are automatically generated by this technology. Anywhere from 10–40% of the bags that are screened alarm current machines. These bags need to be further reviewed to determine whether an actual threat is present. The TSA has suggested new procedures for operators to review the images produced by a CT machine and clear some bags that do not present a threat. Even with these new procedures early tests have shown that anywhere from 8–15% of the bags screened can not be resolved by the machine and the operator. This creates an enormous operational problem for airports.

Under TSA protocol any bag that can not be cleared either automatically by the certified machine or by an operator under their new procedures, must be opened and inspected. The bag opening time varies from about 1.5 minutes up to 20 minutes depending on the location of the bag, the location of the passenger, number of threats in the bag, local airport procedures for opening and inspecting the bags, and whether the bag is locked or not. Not only is the bag opening process time and labor consuming but is intrusive to the privacy of the passenger. It is desirable for airports to achieve as low as possible bag opening rate while maintaining high detection standards. The goal of most airports is to achieve a bag opening rate of under 1% of the screening bags.

SUMMARY OF THE INVENTION

The deficiencies of the prior art are substantially overcome by the CT system of the present invention which includes an initial EDS and one or more secondary CT scanners or processors built into the initial CT scanner. Recognizing that the present invention is the second of a two step scanning process, the invention will be described as the primary or initial scan and secondary scan. Baggage is scanned by the initial CT scan according to any known methods or processes. When a threat is determined by the system, the threat may be resolved by the operator based upon established procedures, such as those proposed or implemented by the TSA or sent directly to the secondary CT scan. As part of the operator resolution process and an aspect of the invention, an operator is able to clear individual threats in a case when baggage has more than one threat. Because the secondary process can be time consuming, clearing individual threats will improve the overall process over the current state-of-the art that allows operators to clear or inspect the entire bag. The baggage may be transferred automatically or manually to the secondary CT scan. Additional information from the secondary CT scan is used to determine whether a threat exists. If the additional information allows the threat to be resolved, then the baggage proceeds under normal airport operation. If the threat cannot be resolved after review by the secondary CT scan, or by an operator using the information from both the primary and secondary CT scan, then the bag may have to be opened under regulatory procedures.

According to another aspect of the invention, the CT system includes multiple secondary CT scans which operate on different principles. The different secondary CT scans provide information useful in resolving different types of detected threats. The CT system selects one of the secondary CT scans based upon the nature of the threat determined by the initial CT scanner. The secondary CT scan operates according to the principles applicable that will provide the best information to resolve that threat.

According to one aspect of the invention, the CT system includes a secondary CT scan which operates at two energy levels. The dual energy CT scanner can provide an image of objects which are shielded. When an initial scan encounters large amounts of metal which prevent identification of an object, the dual energy CT scan is used to resolve objects that are or contained within metal that is too dense for the primary CT scan to penetrate.

According to another aspect of the invention, the CT system includes a secondary CT scan which operates to provide a higher resolution scan of baggage. Different resolution techniques can be used to provide higher resolution. One or more of these techniques may be applied by the secondary CT scan.

According to another aspect of the invention, information regarding the location of a determined threat in a bag is transferred from the initial CT scan to the secondary CT scan. The secondary CT scan only operates on the areas identified as potential threats. Alternatively, according to another aspect of the invention, the secondary CT scan may include a pre-scan mode to locate the potential threat before performing a secondary scan of the area of the potential threat.

DETAILED DESCRIPTION

The present invention relates to a CT scanning system and method for scanning baggage. It is particularly useful for scanning baggage at airports under current laws and TSA regulations. However, the system and method can be used for scanning baggage or packages at other locations or for other scanning processes to determine specific types of contents through scanning. The present invention includes one or more CT scanners. These scanners may be of any known types. The CT scanner operable in the present invention may be loaded by hand or automatically with a conveyor system. It may rotate the baggage or may rotate the x-ray source in obtaining data. It may create images of the bag in any known manner. Provisional application Ser. No. 60/442,246, entitled Method and Apparatus for CT Scanning of Baggage, filed on Jan. 23, 2003, incorporated herein by reference in its entirety, discloses designs for various CT scanners which can be used in the present invention. CT technology involves acquiring x-ray views from at least 180 degrees around an object either by rotating the x-ray source or by rotating the object. The data acquired from these views are mathematically reconstructed into a tomographic or slice image through the object or a three dimensional representation of the object. This image can then be analyzed for explosives or other contraband automatically using sophisticated algorithms. This image can also be presented to a user for analysis.

A study of a couple of pilot sites utilizing the revised TSA operator threat resolution protocol, conducted from November of 2002 through January 2003, uncovered the following results regarding performance of a CT scanning system using the TSA operator threat resolution protocol:

The operator can safely clear about 60%–70% of all machine alarm bags.

Bags contain an average of nearly 2 threats per bag

Most alarms generated by the new operator Alarm Resolution Protocol (ARP) are caused by shield alarms. Shield alarms are alarms caused by large amounts of metal that interfere with the CT scanners' ability to identify an object. All shield alarms must be opened and analyzed by hand. Up to 20% of machine alarms (about 5% of all bags) are shield alarms.

Of the remaining alarm bags about 10%–20% can not be cleared by the operator because they can not identify the alarm object or the object appears tampered with.

While the TSA is investigating several technologies that have the potential to reduce the bag opening rate, none of these technologies address the shield alarm issue and none of these technologies take into account the specific alarms generated by the new operator ARP.

Figure 1:
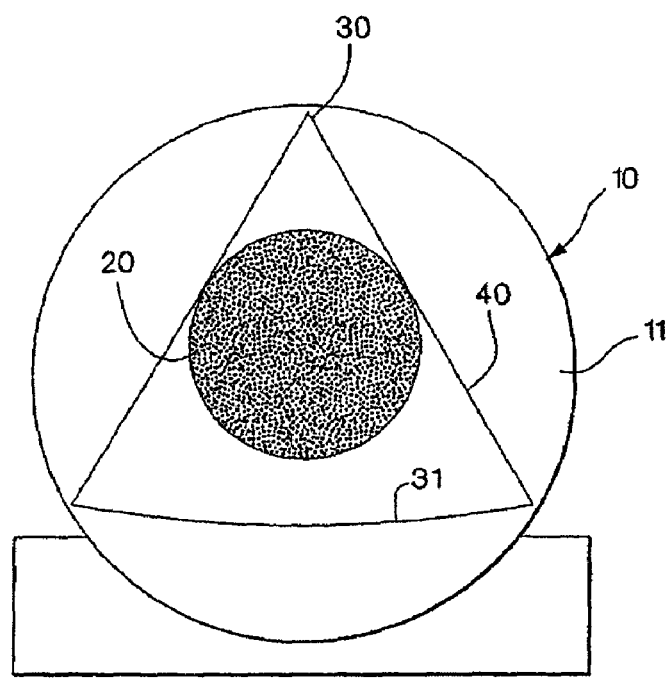
FIG. 1 is a cross sectional view of a conventional CT scanner.
Figure 2:
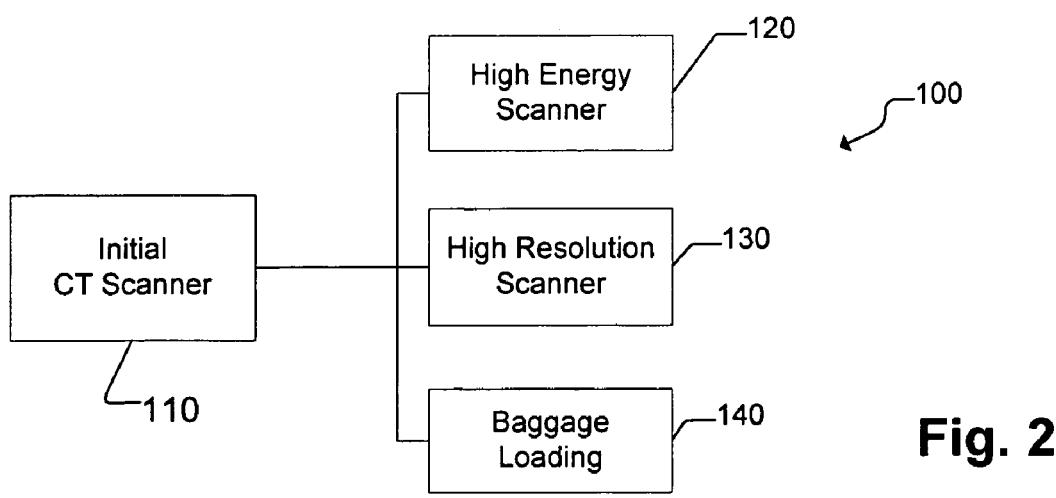
FIG. 2 is a block diagram of a CT scanner system according to an embodiment of the present invention.

FIG. 2 illustrates a CT scanning system 100 according to an embodiment of the present invention. The CT scanning system 100 includes an initial CT scan 100, and one or more secondary CT scan 120, 130. The secondary CT scan 120, 130 have specific operating characteristics for improved scanning. For example, a high energy scanner 120 or a high resolution scan 130 may be used as a secondary CT scan. Each of these types of CT scan are discussed below. While the secondary CT scan 120, 130 are illustrated as two separate devices in FIG. 2, they may be combined into a single scanner. Baggage from the initial CT scan 110 is passed to one of the secondary CT scan 120, 130 or to a baggage loading system 140. Alternatively, in another embodiment, the initial CT scan 110 and secondary CT scans 120, 130 are performed as processes in a single CT scanner. The present invention does not depend upon a specific design and operation of the CT scanner. Any CT scanner can be used which performs the CT scanning processes of the invention.

Figure 3:
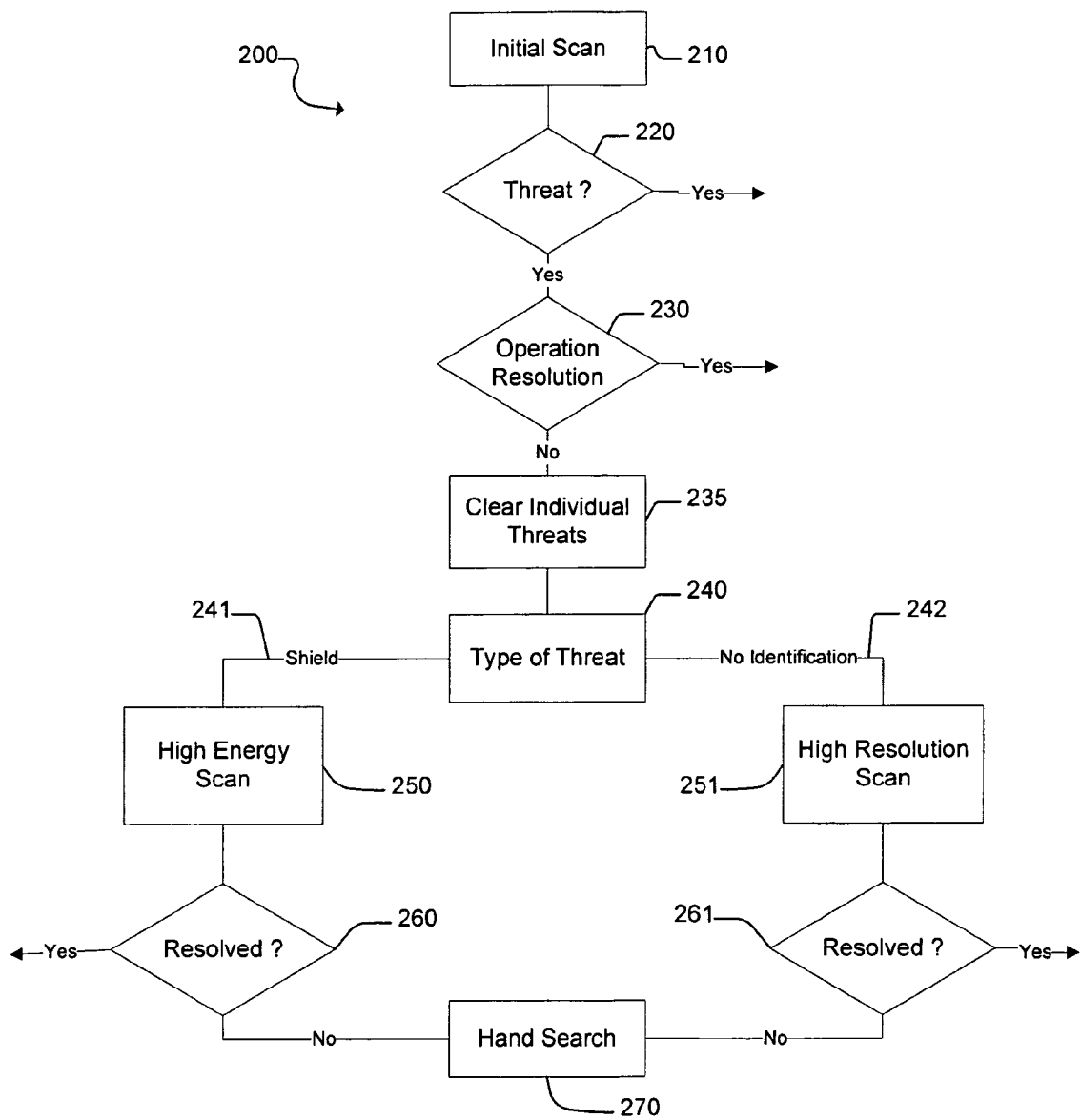
FIG. 3 is a flow diagram of a baggage review process according to an embodiment of the present invention.

The operation 200 of the CT scanning system 100 of the present invention is illustrated in FIG. 3. The operation 100 of the CT scanning system is exemplary and not limited, and can be altered or modified, e.g., by adding, deleting and/or rearranging stages.

At stage 210, an initial scan is made of the bag. The initial CT scan 110 processes the image to determine whether a threat, such as an explosive, and the number of threats present, at stage 220. Conventional methods are used to analyze the CT scanning data to determine threats. If no threats are present, the bag is transferred to the baggage loading system 140. If a threat(s) is found, then in one implementation, the operator seeks to resolve the threat using standard procedures. In another implementation operator resolution 230 is by-passed. If the operator can resolve the threat, the baggage is transferred to the baggage loading system 140. According to one embodiment of the invention, the operator may clear individual threats at stage 235 without clearing all threats in the baggage. No further processing is required for threats cleared by the operator.

If the operator is unable or is not allowed to resolve all the threats, then the baggage is transferred to one of the secondary CT scans 120, 130. The transfer can be done automatically or by hand. At stage 240, the type of threat is analyzed to determine which secondary CT scans to use. If the threat is the result of object shielding 241, i.e., large amounts of metal are present, then a high energy CT scan is performed at stage 250. If the threat is the result of lack of identification 242, then a high resolution CT scan is performed at stage 251. While in a preferred embodiment, the high energy CT scanner 120 and high resolution CT scanner 130 are separate units, they may also be combined into a single unit. If a single unit is used, it is operated either as a high energy CT scanner 120 or a high resolution CT scanner 130 based upon the nature of the threat.

CT scanners in the security industry typically operate at around 150–200 kV. This energy level allows the scanners to penetrate most bags and common objects in bags, operate at a high duty cycle, and at the speed, cost, and resolution required by airport operations. High energy CT systems (320 kV and up) have been used in several non-destructive evaluation applications such as scanning automobile engine blocks and rocket motors. However, high energy CT systems have not been used for security or baggage screening. The high energy CT scan 120 of the present invention might utilize the scanners from known vendors. However, the algorithms to detect explosives using a high energy scanner are also part of this invention. Under current CT systems, when pixel values, pixel quantity or pixel proximity exceed a certain threshold(s), the system declares the object to be a threat. With the high energy CT scan, the system, or operator, can select an energy level that penetrates sufficiently to eliminate or reduce image artifacts sufficiently for the system or operator to analyze highly attenuating volumes, objects and materials. Furthermore, the system can distinguish between metal (and the artifacts metal produces) and explosives.

By using higher resolution techniques and dual energy in a conventional CT machine, more detailed information can be obtained about the shape and nature of an object. Some known high resolution techniques include but are not limited to:

Smaller x-ray focal spot
Smaller detector pitch
¼ shift acquisition
High Resolution single slice
Slowing rotation speed and integrating x-ray's over time
Stacked detector array for dual energy acquisition
Pulsed dual or multi-energy X-ray source
Multiple (recursive) slices of dense regions to reduce overall image noise by averaging multiple slices The high resolution CT scanner 130 utilizes one or more of these techniques to provide a more accurate picture of the possible threat. The specific technique to be used may depend upon the type of object that alarmed the first CT scan. The high resolution CT scanner 130 may use a single technique, a combination of techniques, or all techniques, as appropriate. The images from the CT scanner are analyzed first for the type of alarm (if not already known). For example, an object which is flat and thin may use one technique, while a round or bulky object may use another. Dual energy may work very well for objects like mirrors, toothpaste, and shoes that may have a high atomic number, but not so well on organic objects like food or very cluttered objects like laptops. In the cases of laptops, for example, the system may use a single high resolution slice produced by slowing the rotation speed and/or ¼ shifting the data acquisition. These techniques allow the system to distinguish between an alarm on the screen of the laptop and a real explosive. The system may automatically select an appropriate technique, or the technique may be selected by the operator. Furthermore, the operator may select different techniques until the object can be identified.

In the CT system 100 of the present invention, the initial CT scan 110 determines whether a bag contains a possible threat object. Information about the location of the object may be transferred by the system from the initial CT scan 110 to the appropriate secondary CT scan 120, 130. Thus, the secondary CT scan 120, 130 need only scan the portion of the bag which is a threat. Alternatively, if the location of the object is not provided by the initial CT scan 110, the secondary CT scan 120, 130 will perform a pre-scan process to determine the location. The pre-scan process uses typical CT power, speed and resolution to locate the object of interest before performance of a high energy CT scan or high resolution CT scan.

The secondary CT scan 120, 130 may provide a single CT slice through the object or several sequential CT slices. The data is mathematically reconstructed using known techniques to obtain an image. The resulting image or images are automatically analyzed to determine whether explosives are present. If the secondary CT scan 120, 130 is able to resolve the object to determine that an explosive is not present, stages 260, 261, then the baggage is forwarded to the baggage loading system 140. However, if the secondary CT scan 120, 130 is unable to resolve the threat, the baggage must be hand searched 270 as with all alarms under current processes.

An embodiment of the CT system 100 of the present invention has been described above. Generally, the system uses a secondary CT scan with different operating properties to further analyze objects which cannot be resolved by an initial CT scan. Other machines, operations and arrangements of equipment may be included in the CT system of the present invention. Baggage may be loaded, moved and routed between scanners automatically or manually. A single bag may be processed immediately by the secondary CT scanner after the initial scan. Alternatively, the secondary CT scan may be time delayed based upon availability of the scanner. Multiple initial CT scans may be used in conjunction with one or more secondary CT scans. Object location information may be transferred from the initial CT scan to the secondary CT scan directly, or may be stored for later retrieval when the secondary CT scan is to occur. Having described at least one embodiment of the invention, modifications, adaptations and improvements will be readily apparent to those of ordinary skill in the art. Such modification, changes and adaptations are considered part of the invention.

Having thus described at least one embodiment of the invention, various alternations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. A threat resolution system configured to identify and resolving threats within packages comprising:
   an initial explosives detection CT scanning system for identifying a threat in a package based upon CT reconstructed information of the package and a nature of the threat;
   a first secondary CT scanning system configured to resolve threats having a first nature as identified by the initial explosives detection CT scanning system; and
   a second secondary CT scanning system configured to resolve threats having a second nature as identified by the initial explosives detection CT scanning system.

2. The threat resolution system for identifying and resolving threats within packages according to claim 1, wherein the package is an item of baggage.

3. The threat resolution system for identifying and resolving threats within packages according to claim 1, wherein the nature of the threat includes at least one of object shielding and lack of identification.

4. The threat resolution system for identifying and resolving threats within packages according to claim 1, wherein the first secondary CT scanning system includes a dual energy CT scanner.

5. The threat resolution system for identifying and resolving threats within packages according to claim 4, wherein the second secondary CT scanning system includes a high resolution scanner.

6. The threat resolution system for identifying and resolving threats within packages according to claim 1, wherein the first secondary CT scanning system includes a high resolution scanner.

7. The threat resolution system for identifying and resolving threats within packages according to claim 1, further comprising:
   an operator review station for reviewing threats identified by the initial explosives detection CT scanning system and clearing individual threats in packages prior to resolution by one of the secondary CT scanning systems.

8. The threat resolution system for identifying and resolving threats within packages according to claim 1, wherein the initial explosives detection CT scanning system and at least one of the first secondary CT scanning system and second secondary CT scanning system include processes within a single scanner.

9. A method of scanning packages for resolution of threats, the method comprising:
   performing an initial CT scan of a package;
   performing CT reconstruction on information from the initial CT scan to obtain CT reconstruction information;
   identifying at least one threat and at least one respective nature of the at least one threat based upon the CT reconstruction information;
   performing a secondary CT scan of a first type on the package where the packages has a threat of a first nature;
   performing a secondary CT scan of a second type on the package where the packages has a threat of a second nature; and
   resolving the at least one threats based upon at least one of the secondary CT scan of the first type and the secondary CT scan of the second type.

10. The method for scanning packages for resolution of threats according to claim 9, wherein the package is an item of baggage.

11. The method for scanning packages for resolution of threats according to claim 9, wherein at least one of the secondary CT scan of the first type and the secondary CT scan of the second type includes a dual energy scan.

12. The method for scanning packages for resolution of threats according to claim 9, wherein at least one of the secondary CT scan of the first type and the secondary CT scan of the second type includes a high resolution scan.

13. The method for scanning packages for resolution of threats according to claim 9, wherein the at least one respective nature of the at least one threat includes at least one of shielding objects and lack of identification.

14. The method for scanning packages for resolution of threats according to claim 9, further comprising, prior to performing the secondary scan of the first type:
   displaying identified threats to an operator; and
   receiving an input from an operator clearing at least one threat in the package.

* * * * *